US012548699B2

(12) United States Patent
Chen et al.

(10) Patent No.: US 12,548,699 B2
(45) Date of Patent: Feb. 10, 2026

(54) THIN FILM RESISTOR

(71) Applicant: VIKING TECH CORPORATION, Hsinchu County (TW)

(72) Inventors: Zhong-Yu Chen, Hsinchu County (TW); Cheng-Chung Chiu, Hsinchu County (TW); Shun-Ho Kuo, Hsinchu County (TW); Chi-Yu Lu, Hsinchu County (TW)

(73) Assignee: VIKING TECH CORPORATION, Hsinchu County (TW)

( * ) Notice: Subject to any disclaimer, the term of this patent is extended or adjusted under 35 U.S.C. 154(b) by 384 days.

(21) Appl. No.: 18/296,260

(22) Filed: Apr. 5, 2023

(65) Prior Publication Data

US 2023/0326635 A1 Oct. 12, 2023

(30) Foreign Application Priority Data

Apr. 6, 2022 (TW) ................................ 111112986

(51) Int. Cl.
*H01C 7/00* (2006.01)
*H01C 1/012* (2006.01)

(52) U.S. Cl.
CPC ............ *H01C 7/006* (2013.01); *H01C 1/012* (2013.01)

(58) Field of Classification Search
CPC ................................ H01C 7/006; H01C 1/012
See application file for complete search history.

(56) References Cited

U.S. PATENT DOCUMENTS 4,375,056 A * 2/1983 Baxter .................. H01C 7/021 338/195
5,065,221 A * 11/1991 Imamura ................. H10D 1/47 338/195
6,084,502 A * 7/2000 Ariga .................... H01C 17/23 338/195
6,292,091 B1 * 9/2001 Kambara ................ H01C 7/00 338/195
6,437,681 B1 * 8/2002 Wang .................... G01K 7/183 338/28
11,443,877 B2 * 9/2022 Kaneko ................. H01C 10/10
2023/0326635 A1 * 10/2023 Chen .................. H01L 23/5228

FOREIGN PATENT DOCUMENTS

JP 4203499 * 1/2009 ............... H01C 1/08

OTHER PUBLICATIONS

JP-4203499 machine translation (Year: 2009).*

* cited by examiner

*Primary Examiner* — Kyung S Lee
(74) *Attorney, Agent, or Firm* — MUNCY, GEISSLER, OLDS & LOWE, P.C.

(57) ABSTRACT

A thin film resistor is provided, and a resistance layer of the thin film resistor is a patternized mesh. The mesh density of the mesh resistance layer increases from center to both ends of the film resistor. The temperature peak is shifted from the center to both ends of the film resistor. Therefore, the heat can be quickly dissipated via the electrodes.

7 Claims, 3 Drawing Sheets

THIN FILM RESISTOR

BACKGROUND OF THE INVENTION

1. Field of the Invention

The present invention relates to a thin film resistor, in particular to a thin film resistor with high heat dissipation efficiency.

2. Description of the Prior Art

A general resistor structure usually includes a rectangular insulating substrate, two electrodes arranged on both sides of the surface, and a resistance layer is arranged on the surface of the substrate between the two electrodes and connected with the two electrodes.

In the resistance adjustment process, the resistance layer is irradiated with laser light to repair and/or adjust the resistance.

The temperature peak locates at the center and gradually decreases to the electrodes for conventional resistor. The heat dissipation path is too long to reduce the heat dissipation efficiency.

SUMMARY OF THE INVENTION

In order to solve the above-mentioned problems, the present invention uses a specific pattern of the resistance layer to shift the temperature peak from the center to the ends close to the electrodes. Therefore, the heat dissipation path is reduced.

The invention provides a thin film resistor, and the resistance layer of the film resistor has a mesh pattern. In one embodiment, the mesh pattern includes two mesh densities. The mesh density of the pattern is high near the center of the resistor and low near both electrodes.

The present invention provides a thin film resistor, and the resistance layer of the film resistor has a mesh pattern with a various mesh density. The mesh density increases from the center to both ends of the film resistor.

DESCRIPTION OF THE PREFERRED EMBODIMENTS

Various embodiments of the present invention will be described in detail as below, and the drawings will be used as examples to help readers to have a better understanding. In addition to these detailed descriptions, the present invention can also be widely implemented in other embodiments. Any substitutions, modifications, and equivalent changes of the embodiments should be understood to be included in the scope of the present invention. The scope of patents should be based on the scope of the claims. It should be noted that the drawings are for illustrative purposes only, and do not represent the actual size or quantity of the components. Some details may not be completely drawn in order to keep the drawings concise.

The present invention provides a thin film resistor. Both ends of the film resistor are electrodes, and a resistance layer on the substrate is between electrodes and connected the electrodes. The resistance layer is formed to have a mesh pattern. In one embodiment, the mesh pattern comprises connected multiple mesh portions and different mesh portion has different mesh density. In one embodiment, the mesh pattern has a mesh density varies with the position on the film resistor. The mesh pattern can be formed by lithographic etching. The mesh density is high (i.e. fine mesh) near the electrodes and low (coarse mesh) near the center of the film resistor, and the area covered by the coarse mesh is larger than that covered by the fine mesh. Such design distributes the thermal focus from the center to both ends of the film resistor. As a result, the length of the dissipation path is reduced to have a better heat dissipation efficiency.

Figure 1:
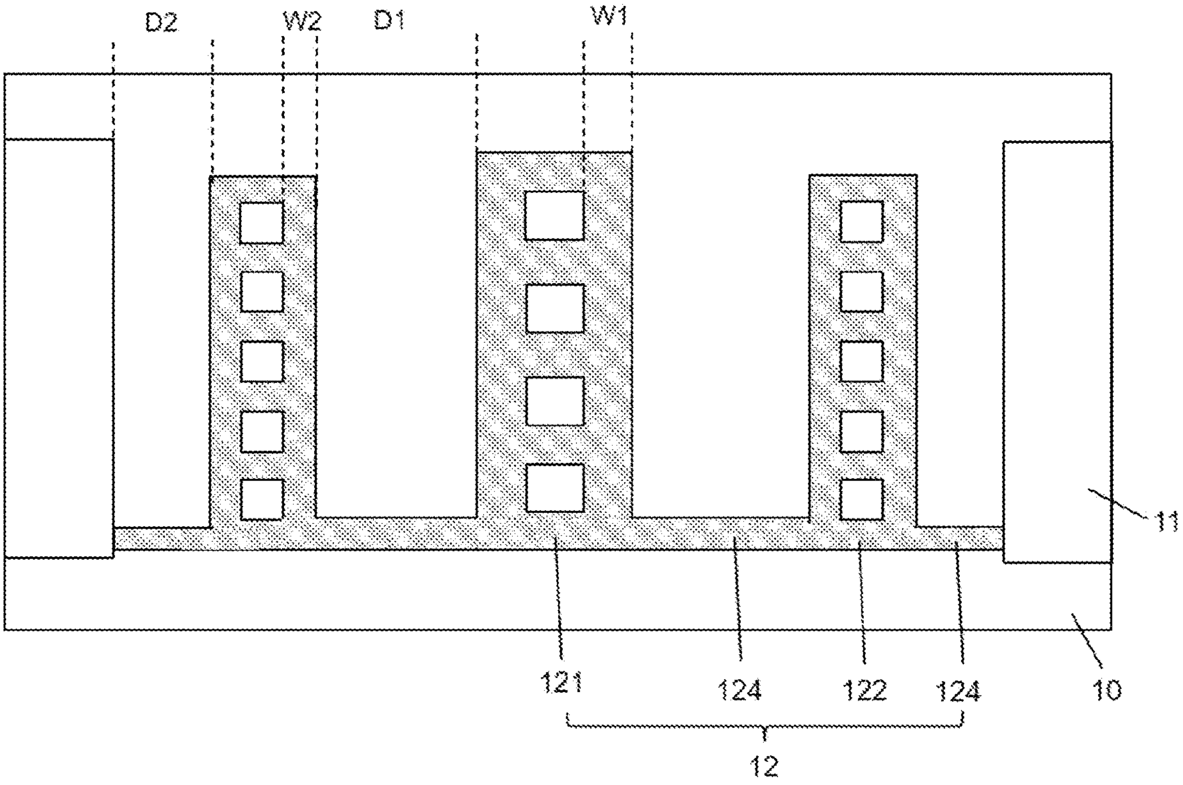
FIG. 1 is a top view of a thin film resistor according to an embodiment of the present invention.

FIG. 1 is a top view of a thin film resistor according to an embodiment of the present invention. In this embodiment, the thin film resistor includes a substrate 10, two electrodes 11 arranged on both ends of the substrate 10, and a resistance layer 12 on the substrate 10 between the two electrodes 11 and connected to the electrodes 11. It is characterized that the resistance layer is formed as a mesh pattern, and the mesh pattern has connected multiple mesh portions. The first mesh portion 121 is a coarse mesh or a low-density mesh near the center. The second mesh portion 122 is a fine mesh or a high-density mesh near the electrode 11. The connection parts 124 are used to connect the electrodes 11, the second mesh portions 122 and the first mesh portion 121.

In one embodiment, the area covered by the second mesh portion 122 is smaller than that covered by the first mesh portion 121. The area covered by the second mesh portion 122 is 50~75% of that covered by the first mesh portion 121 area.

Preferably, the wire width W2 of the second mesh portion 122 is 50~75% of the wire width W1 of the first mesh portion 121.

Preferably, the distance D2 between the electrode 11 and the second mesh portion 122 is 50~75% of the distance D1 between the first mesh portion 121 and the second mesh portions 122.

Figure 2:
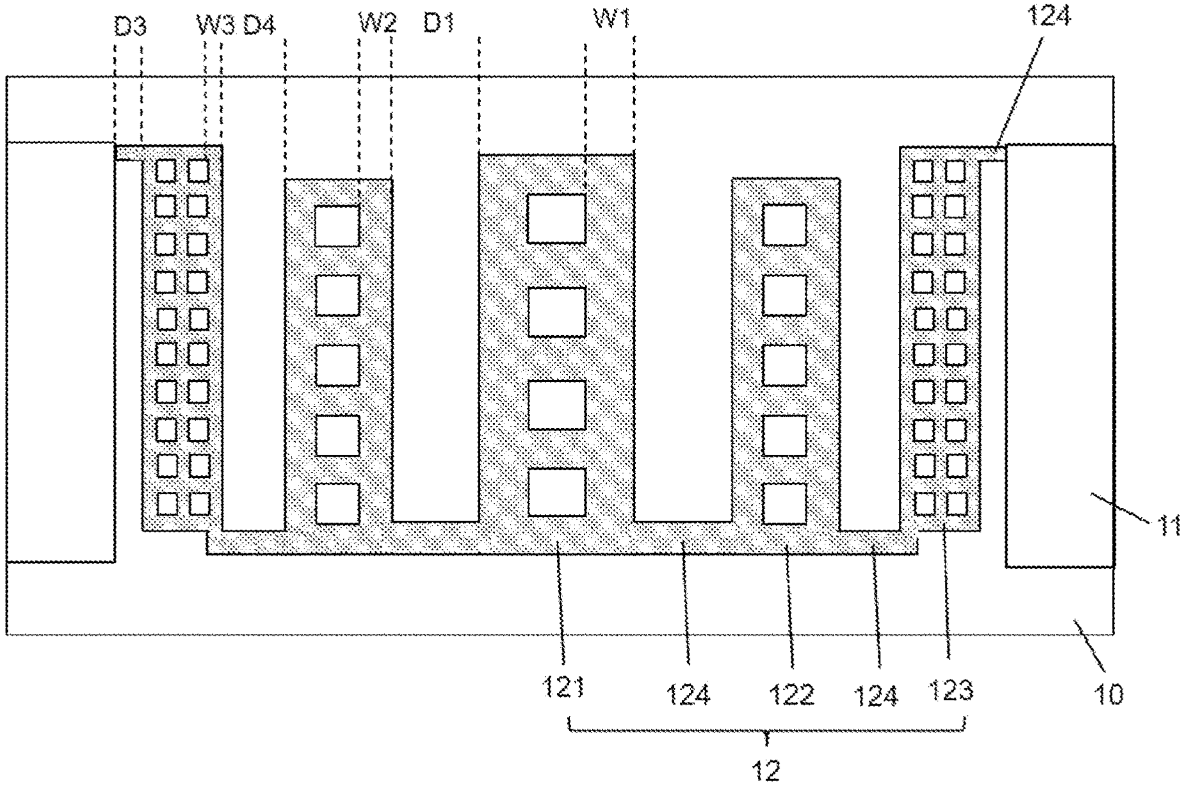
FIG. 2 is a top view of a thin film resistor according to another embodiment of the present invention.

FIG. 2 shows another embodiment. The mesh pattern of the resistance layer 12 further includes a third mesh portion 123 between the second mesh portion 122 and the electrode 11. It is easy to realize that the multiple connection parts 124 are also electrically connected.

In this embodiment, the area covered by the first mesh portion 121, the second mesh 122 and the third mesh 123 decreases gradually with a ratio 50~75%.

Preferably, the mesh width W1 of the first mesh portion 121, the width W2 of the second mesh portion 122, and the width W3 of the third mesh portion 123, also decreases gradually with a ratio 50~75%.

Preferably, the distance D3 between the electrode 11 and the third mesh portion, the distance D4 between the third mesh portion 123 and the second mesh portion 122, and the distance D2 between the second mesh portion 122 and the first mesh portion 121, also decrease gradually with a ratio 50~75%.

In the above embodiment, the first mesh portion 121, the second mesh portion 122 and the third mesh portion 123 are rectangular, and the mesh is also rectangular. Preferably, the area covered and/or wire width of the first mesh portion 121, the second mesh portion 122 and the third mesh portion 123 varies with a ratio 4:2:1.

Obviously, the mesh density gradually increases from the center to the electrode, and the two adjacent mesh portions are getting closer. When the current passes through, the temperature distribution variation is positively related to the mesh density and the thermal peaks are distributed, and the maximum peak will be adjacent to the electrodes to have a better heat dissipation.

Figure 3:
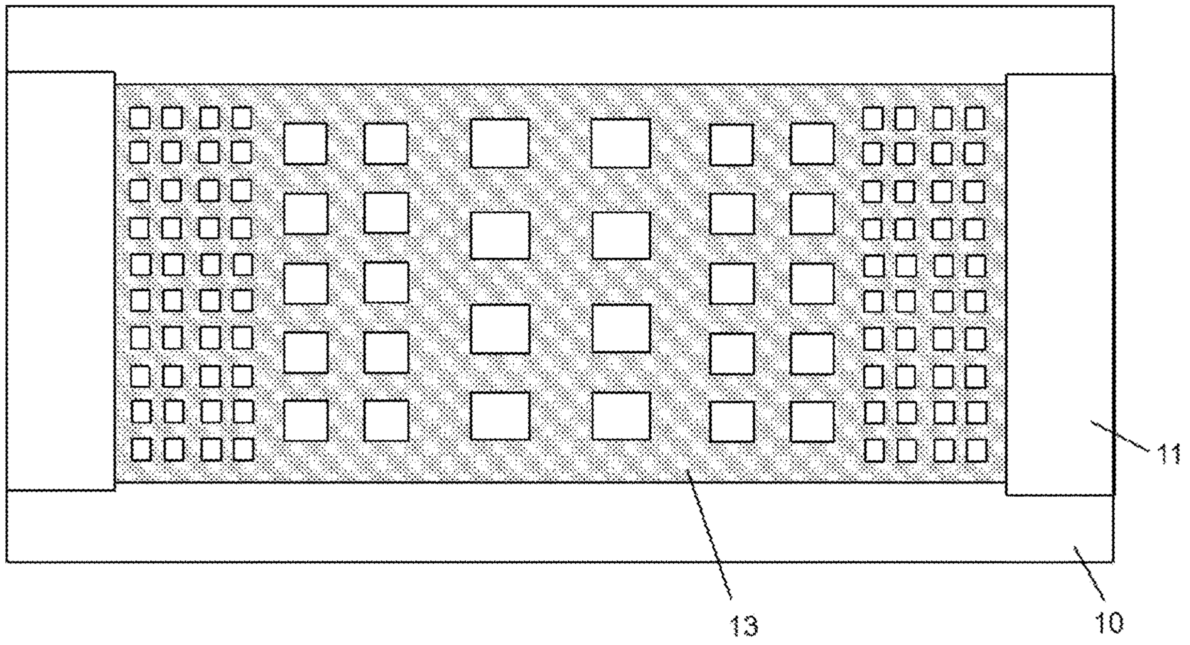
FIG. 3 is a top view of a thin film resistor according to another embodiment of the present invention.

FIG. 3 shows another embodiment. The thin film resistor includes at least a substrate 10, two electrodes 11 are arranged on both ends of the substrate 10, and a mesh resistance layer 13 is arranged on the substrate 10 between the two electrodes 11 and electrically connected to the two electrodes 11. The mesh density increases from the center to the electrode 11. Preferably, the area of the mesh resistance layer 13 decreases when the mesh density increases, i.e. decreases from the center to the electrode 11.

The substrate material is aluminum nitride, and the electrode material is copper. Both have high thermal conductivity. The mesh pattern design can enhance the heat dissipation rate.

The mesh resistance layer of the thin film resistor can decrease the temperature near the center and increase the temperature near the electrodes. However, the shifted temperature peak is adjacent to the electrodes to have a shorter dissipation path and a better heat dissipation efficiency. Therefore, the whole temperature of the film resistor is decreased and the temperature distribution is homogenized in the mean while.

What is claimed is:

1. A thin film resistor, comprising:

two electrodes disposed on both ends of a substrate; and a resistance layer, disposed on the substrate between the two electrodes and connected to the two electrodes, wherein the resistance layer is formed with a mesh pattern having a mesh density which increases from a center of the film resistor to the electrodes, the mesh pattern has a low-density portion near the center of the film resistor and a high-density mesh portion near both ends of the film resistor, wherein a second distance between the high-density portion and the electrode, is 50~75% of a first distance between the low-density portion and the high-density portion, wherein a first area covered by the high-density portion, is 50~75% of a second area covered by the low-density portion, and wherein a wire width of the high-density portion is 50~75% of a wire width of the low-density portion.

2. The thin film resistor according to claim 1, wherein the mesh pattern further includes a middle-density portion between the low-density portion and the high-density portion.

3. The thin film resistor according to claim 2, wherein a third distance between the electrode and the high-density portion is 50~75% of a forth distance between the high-density portion and the middle-density portion.

4. The thin film resistor according to claim 2, wherein a third area covered by the middle-density portion, is 50~75% of the first area covered by the high-density portion.

5. The thin film resistor according to claim 2, wherein a wire width of the middle-density portion is 50~75% of the wire width of the high-density portion.

6. The thin film resistor according to claim 2, wherein the low-density portion, the middle-density portion and the high-density portion are rectangular.

7. The thin film resistor according to claim 1, wherein the substrate material is aluminum nitride, and the electrode materials is copper.

* * * * *